United States Patent [19]

Bergner et al.

[11] 4,212,721
[45] Jul. 15, 1980

[54] EQUIPMENT FOR REGULATING, MONITORING, OPTIMIZING AND OPERATING, AND FOR DISPLAYING DATA IN, ALKALI METAL CHLORIDE ELECTROLYSIS PLANTS

[75] Inventors: Dieter Bergner, Kelkheim; Erhard Heubach, Sulzbach; Winfried Hofmann, Kelkheim; Ortwin Küster, Hofheim am Taunus; Lothar Pelz, Rödermark, all of Fed. Rep. of Germany

[73] Assignee: Hoechst Aktiengesellschaft, Frankfurt am Main, Fed. Rep. of Germany

[21] Appl. No.: 920,444

[22] Filed: Jun. 29, 1978

[30] Foreign Application Priority Data

Jul. 1, 1977 [DE] Fed. Rep. of Germany ....... 2729732

[51] Int. Cl.² ............... C25B 15/02; C25B 15/04; C25B 9/00
[52] U.S. Cl. ............................... 204/219; 204/225; 204/228; 204/250
[58] Field of Search .................... 204/219–220, 204/250, 228, 225; 340/151, 172, 183

[56] References Cited

U.S. PATENT DOCUMENTS

| 4,035,771 | 7/1977 | Büsing et al. | 204/228 X |
| 4,067,793 | 1/1978 | Piras | 204/219 |
| 4,082,639 | 4/1978 | Ralston et al. | 204/250 X |

Primary Examiner—John H. Mack
Assistant Examiner—D. R. Valentine
Attorney, Agent, or Firm—Curtis, Morris & Safford

[57] ABSTRACT

Equipment for controlling, monitoring, determining the most effective operating conditions and operating, and for displaying data in, alkali metal chloride electrolysis plants which are operated by the amalgam process, wherein the equipment has, for each electrolytic cell or for each group of electrolytic cells, a data collecting and processing device for controlling, monitoring and determining the most effective operating conditions the electrolytic cell or group, and all the data collecting and processing devices are connected to a central data collecting and processing device for central operation and for displaying data.

6 Claims, 1 Drawing Figure

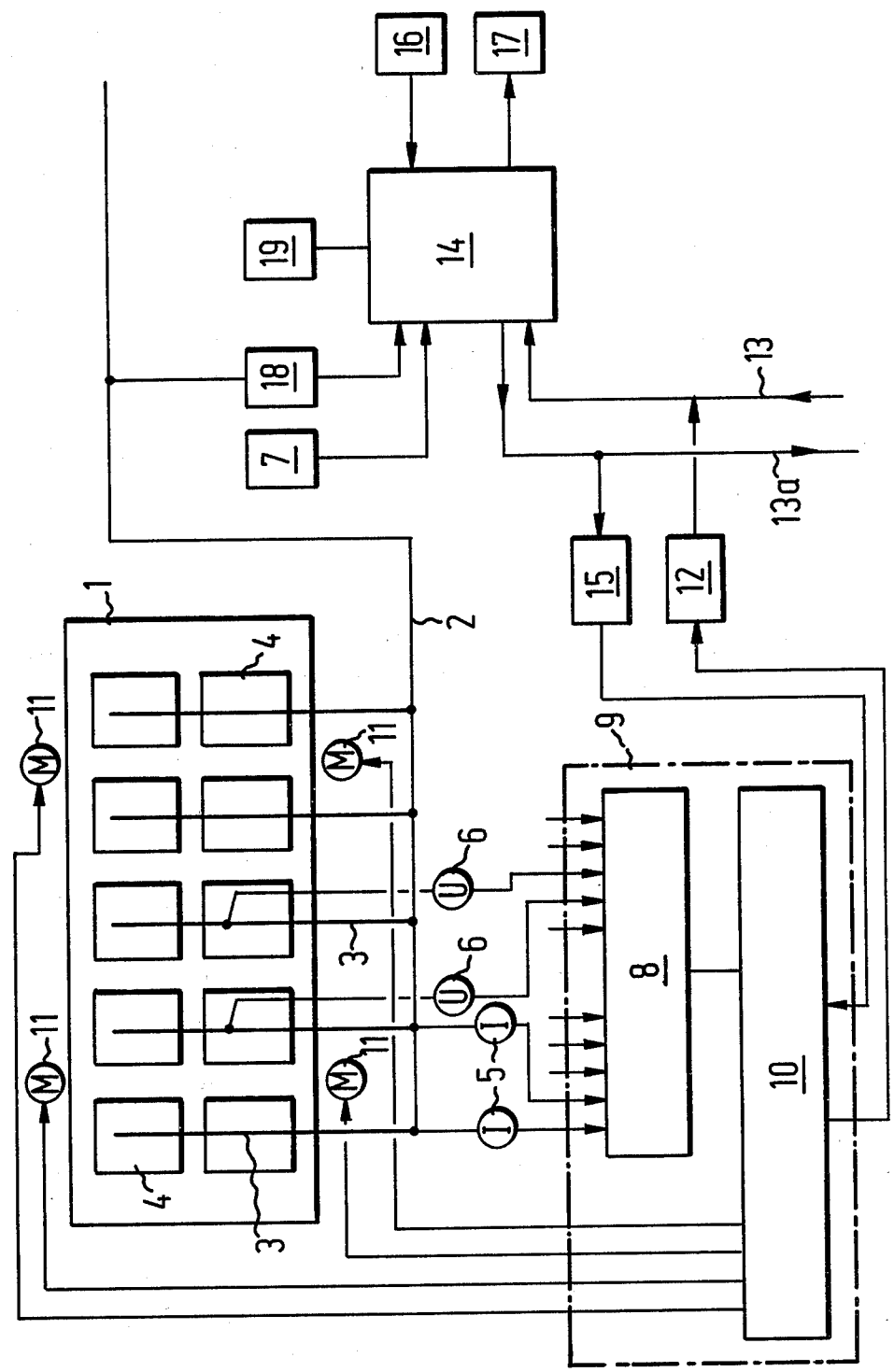

EQUIPMENT FOR REGULATING, MONITORING, OPTIMIZING AND OPERATING, AND FOR DISPLAYING DATA IN, ALKALI METAL CHLORIDE ELECTROLYSIS PLANTS

The invention relates to equipment for controlling monitoring, and operating in accordance with the most effective conditions, and for displaying data in, alkali metal chloride electrolysis plants which are operated by the amalgam process. It is known from German Auslegeschrift No. 1,767,840 to control, monitor, and operate alkali metal chloride electrolysis plants by a central control unit, for example by a process computer. Since the accomplishment of the above functions is dependent on the availability of the central control unit, the entire central control unit was, for safety reasons, duplicated or supplemented by an ancillary device. If the first central control unit failed, the second central control unit, which must always be able to function and be available for use, was able to take over the functions of the first unit. The function of the ancillary device, on the other hand, is merely to increase the anode/cathode distance, if the central control unit should fail, such that short circuits can no longer arise, even under extreme conditions.

It is known from German Offenlegungsschrift No. 2,352,372 that a potential separation is necessary in the case of centrally organized control systems. For the measured variables, this potential separation is carried out as an analog separation using, for example, a direct current transformer.

The disadvantage of the system with an ancillary device is that, for the individual functions, such as regulating, operating and the like, or for automatic operation, the individual functions cannot be registered for all the cells of the electrolysis plant if the central control unit fails, and thus operation can be maintained only in a severely restricted manner and uneconomically, as a result of the increased distance between the electrodes. The disadvantage of duplication of the system is the high expenditure and technical outlay. In general, it holds true that the disadvantage of a centrally organized system cannot be eliminated by ancillary devices or by duplication of the system. As is known, the disadvantage is that when a central system fails all the functions of the system fail.

A further disadvantage is the expensive analog potential separation with its negative effect on the accuracy of measurement.

The object on which the invention is based is, therefore, to provide equipment which is subdivided in accordance with the specific functions into independently operating decentrally organized devices, so that if one device fails at least the primary functions of control, monitoring and operating in accordance with the most effective operating conditions can be maintained with the other devices capable of functioning:

The object is achieved according to the invention by an equipment for controlling, monitoring optimizing and operating in accordance with the most effective operating conditions and for displaying data in, alkali metal chloride electrolysis plants which are operated by the amalgam process, wherein the equipment has, for each electrolytic cell or for each group of electrolytic cells, a data collecting and processing device for controlling, monitoring, and operating the electrolytic cell or groups of cells, and all the data collecting and processing devices, are connected to a central data collecting processing device for central operation and for displaying the data.

The decentralization and subdivision of the equipment into decentralized data collecting and processing devices on the one hand and a central data collecting and processing device on the other hand enables the potential separation to be carried out digitally. In place of the direct current transformers necessary for the analog separation it is possible to use, for example, inexpensive opto-couplers or relays. The device for digital potential separation is located between the data collecting devices of the electrolytic cells and the central data collecting and processing device. The central data collecting and processing device can have a further data collecting device for sensing and collecting data regarding measured variables specific to cell units.

In order to carry out the function of cell voltage control effective operation and short-circuit monitoring, the current and voltage measured variables of the electrolytic cell must be sensed. The measuring points for these measured variables are on current-carrying parts of the cell. The functions of operation and data display, which are to be carried out by the central unit, are carried out with the central data collecting and processing unit which superordinates the decentralized data collecting and processing units and, for this purpose, data, for example the current distribution in the cell, flow from the decentralized devices to the central device. Measured variables which do not have to be sensed for each specific cell but must be sensed only once per cell assembly, such as, for example, total current, brine temperature, brine concentration and the like, are sensed by the central unit and transmitted to the decentralized units. There is thus an exchange of data between the decentralized units and the central unit and individual parameters, such as, for example, the desired value of the cell voltage, can be corrected by means of this exchange.

An automation system of extremely high availability for alkali metal chloride electrolysis plants has been provided by means of the equipment according to the invention, with which the measured variables are processed in decentralized units and operating and data functions are treated, and measured variables which are not cell-specific are sensed, in a central unit. If one decentralized unit fails, the other units can continue to function undisturbed. Likewise, the primary functions of cell control, effective operation and monitoring are continued without interruption if the central unit fails.

The equipment according to the invention is illustrated in more detail in the FIGURE in an illustrative embodiment.

The FIGURE shows a schematic representation of an alkali metal chloride electrolytic cell 1 with the current supply 2. The total current supplied is distributed to the anodes 4 via individual conductor bars 3. The current and voltage measured variables necessary for cell monitoring and control are tapped from the cell by means of ammeters 5 and voltmeters 6 and fed to the sensing device 8, for example of a microcomputer 9. The function of the sensing device 8 is to convert the analog measured variables from 5 and 6 into digital signals. The potential of the sensing device 8 is the cell potential. The measured variables are processed in the processing device 10 of the microcomputer 9 and the anodes are adjusted in accordance with the state of the cell by the servo-motors 11 from the processing device 10. The microcomputer 9 which is assigned to the electrolytic cell for the functions of cell monitoring, and control in accordance with the most effective operating conditions has a connection 13, 13a to a superordinated unit 14, for example a process computer, for transferring cell data, such as, for example, current distribution, and for receiving data relating to the entire cell installation, such as, for example, total current. The potential separation between the central process computer for the functions of process operation and data display takes place at the level of the digital signals; in this case, for example, at a position between the microcomputer 9 and the superordinated process computer 14, the microcomputers 9 are connected by means of opto-couplers 12 and 15 to the central process computer 14. In addition, the data input equipment 16 and output equipment 17 are also connected to the process computer 14. The process computer 14 also contains a sensing unit for the values specific to the cell installation, such as, for example, total current, brine temperature, brine concentration, anolyte concentration and anolyte temperature, which are measured by ammeters 18, densimeters 19 and thermometers 7. The microcomputers 9i, which belong to the electrolytic cells 1i, are connected, parallel to the microcomputer 9, to the lines 13 and 13a (not shown). i denotes the number of electrolytic cells or the number of microcomputers from 1 to n.

We claim:

1. Apparatus for controlling, monitoring and operating, and for displaying data in, alkali metal chloride electrolysis plants which are operated by the amalgam process, comprising a plurality of groups of electrolytic cells, each group including m cells wherein m is an integer; a plurality of microcomputer control means, each associated with a respective group of electrolytic cells, each said microcomputer control means comprising sensing means for sensing variables representing the operating conditions of said cells in said group to monitor the operation of said cells, and processing means responsive to said sensing means for controlling the operation of said cells in said group such that said cells operate in accordance with the most effective operating conditions; and a central processing computer means common to all of said microcomputer control means, said central processing computer means being connected to each said microcomputer control means for displaying data associated with all of said groups of cells and for supplying to each of said microcomputer control means data representing the overall operation of all of said groups of cells.

2. The apparatus of claim 1 wherein said sensing means included in each of said microcomputer control means comprises voltage and current measuring for measuring the voltage and the current of each cell in said group; and converting means for converting the measured voltage and current into digital representations thereof.

3. The apparatus of claim 2, further comprising motor means for adjusting the anodes in each cell included in a group; and wherein the processing means included in each of said microcomputer control means comprises digital computer means for receiving the digital representations of said measured voltage and current to produce control signals, said control signals being supplied to said motor means to control the operation thereof.

4. The apparatus of claim 3 wherein said central processing computer means comprises a central computer for receiving from each digital computer included in each of said microcomputer control means data representing the current distribution of the cells included in each group, for receiving data representing total operation variables of the electrolysis plant, and for supplying to each said digital computer data representing the total current distribution of all of said groups.

5. The apparatus of claim 4 further comprising total sensing means coupled to said central computer for sensing total operation variables, including total current, brine temperature, brine concentration, anolyte temperature and anolyte concentration of said electrolysis plant.

6. The apparatus of claim 2 or 4 further comprising digital potential separating means for coupling each of said control means to said central processing device.

* * * * *